US010715466B2

(12) United States Patent
Cosentino et al.

(10) Patent No.: US 10,715,466 B2
(45) Date of Patent: Jul. 14, 2020

(54) SYSTEMS AND METHODS FOR LOCATING APPLICATION-SPECIFIC DATA ON A REMOTE ENDPOINT COMPUTER

(71) Applicant: MAGNET FORENSICS INC., Waterloo (CA)

(72) Inventors: Nicholas Bruce Alexander Cosentino, Waterloo (CA); Tayfun Uzun, Waterloo (CA)

(73) Assignee: MAGNET FORENSICS INC., Waterloo (CA)

(*) Notice: Subject to any disclaimer, the term of this patent is extended or adjusted under 35 U.S.C. 154(b) by 0 days.

(21) Appl. No.: 16/136,346

(22) Filed: Sep. 20, 2018

(65) Prior Publication Data

US 2019/0020604 A1    Jan. 17, 2019

Related U.S. Application Data

(63) Continuation of application No. 14/722,713, filed on May 27, 2015, now Pat. No. 10,104,019.

(60) Provisional application No. 62/003,433, filed on May 27, 2014.

(51) Int. Cl.
| | |
|---|---|
| *G06F 15/16* | (2006.01) |
| *H04L 12/861* | (2013.01) |
| *H04W 4/50* | (2018.01) |
| *G06F 16/28* | (2019.01) |
| *H04L 29/06* | (2006.01) |
| *H04W 12/00* | (2009.01) |

(52) U.S. Cl.
CPC ............ *H04L 49/90* (2013.01); *G06F 16/283* (2019.01); *H04L 63/306* (2013.01); *H04L 63/308* (2013.01); *H04W 4/50* (2018.02); *H04W 12/00* (2013.01)

(58) Field of Classification Search
CPC ..... H04L 49/90; H04L 63/306; H04L 63/308; H04W 4/50; H04W 12/00
See application file for complete search history.

(56) References Cited

U.S. PATENT DOCUMENTS

| | | | |
|---|---|---|---|
| 7,784,091 B2 | 8/2010 | Ikehira et al. | |
| 8,131,281 B1 | 3/2012 | Hildner et al. | |
| 8,196,199 B2 | 6/2012 | Hrastar et al. | |
| 8,424,086 B2* | 4/2013 | Goldman | H04L 63/1458 726/13 |
| 8,788,601 B2* | 7/2014 | Rajasekar | G06F 9/5027 709/206 |
| 9,128,771 B1* | 9/2015 | Garg | G06F 9/5005 |
| 9,237,163 B2* | 1/2016 | Rihn | G06F 21/56 |

(Continued)

FOREIGN PATENT DOCUMENTS

WO    2012015363 A1    2/2012

*Primary Examiner* — Moustafa M Meky
(74) *Attorney, Agent, or Firm* — Bereskin & Parr LLP/S.E.N.C.R.L., s.r.l.

(57) ABSTRACT

According to one aspect, a system for locating application-specific data that includes a server, a broker, and an agent. An operator may define a command using the server, and this command may be sent to the broker. The broker may then send the command to the agent operating on an end-point system. The agent may then conduct an application-specific data search on the end-point system in respect of the user command. Search results may then be sent to the broker. The broker may then sent the search results to the server.

10 Claims, 7 Drawing Sheets

(56) References Cited

U.S. PATENT DOCUMENTS

| | | | |
|---|---|---|---|
| 9,432,437 B1* | 8/2016 | Leonard | H04L 67/02 |
| 10,430,135 B2* | 10/2019 | Shimomoto | G06F 3/1265 |
| 2007/0169193 A1 | 7/2007 | Ikehara et al. | |
| 2009/0313637 A1* | 12/2009 | Evans | G06F 9/546 |
| | | | 719/314 |
| 2011/0023086 A1* | 1/2011 | Goldman | H04L 63/1458 |
| | | | 726/3 |
| 2013/0111150 A1* | 5/2013 | Zhao | G06F 12/0891 |
| | | | 711/144 |
| 2015/0317368 A1 | 11/2015 | Rhoads et al. | |
| 2016/0344816 A1* | 11/2016 | Shimomoto | G06F 3/1268 |

* cited by examiner

SYSTEMS AND METHODS FOR LOCATING APPLICATION-SPECIFIC DATA ON A REMOTE ENDPOINT COMPUTER

CROSS-REFERENCE TO RELATED APPLICATIONS

This application is a continuation of U.S. patent application Ser. No. 14/722,713 filed on May 27, 2015, which claims the benefit of U.S. Provisional Patent Application No. 62/003,433 filed on May 27, 2014, both entitled SYSTEMS AND METHODS FOR LOCATING APPLICATION-SPECIFIC DATA ON A REMOTE ENDPOINT COMPUTER, each of which is incorporated herein by reference in their entirety.

TECHNICAL FIELD

The embodiments disclosed herein relate to systems, methods, and computer-readable media for locating application-specific data, and in particular, to systems, methods, and computer-readable media for issuing search commands from a server and executing the search commands on an end-point system.

INTRODUCTION

With the advent of computer technology and the Internet, many people spend large amounts of time using computers for many different reasons. For example, users may use computers in the course of employment, to access social networks, communicate with other people using email or chat applications, conduct online shopping, process digital photography, research information, and so on.

Generally, applications on a computer will create application-specific user data associated with one or more users interacting with the application. For example, if a user is using an online chat program, there may be a chat history indicating contents of one or more chats between the user and various other communication partners. Similarly, an online shopping experience may leave electronic records of shopping or browsing history, for example as information stored in cookies associated with various shopping web sites.

For various reasons, a user may attempt to hide, delete, or obfuscate some of this information so that it will not be readily accessible to someone else. In particular, this obfuscation may occur where a user has undertaken some illicit or otherwise improper activity (for example using a work computer to access improper materials) and does not want to be caught.

In some cases, it may be desirable for another party to know how a particular computer has been used by a given individual (or in some cases a group of individuals). For example, law enforcement authorities may be interested to learn about the activities undertaken by a suspect on one or more computing devices, such as a laptop or smartphone. Similarly, employers may be interested to learn how their computer resources are being used by their employees.

In some cases, the computing device of interest may or may not be physically inaccessible to the party that wants to know how that computing device has been used.

SUMMARY

According to some embodiments, there is a system, method, and computer-readable medium for locating application-specific data.

The system may include a server on which an operator can define a command. The command may define the parameters for a particular application-specific data search on an end-point system.

The system may further include an agent operating on an end-point system. The agent may be used to conduct the application-specific data search on the end-point system, as specified by the command generated by the operator.

The system may further include a broker. The broker may be used to receive the command from the server, and relay this command to the agent.

For example, the agent may produce real-time search results from the search, and the search results may be sent substantially in real-time to the broker. However, this is possible only when a viable communications channel exists between the agent and the broker.

When a communications channel between the agent and broker is not currently viable, then the agent may store the search results in a data store of the data storage device of the end-point system. In some examples, the data store may be an encrypted data store.

The server may send a command using an output port on the server for which any associated inbound port may be inactive, disabled, or inaccessible.

According to some other embodiments, there is a system, method, and computer-readable medium for locating application-specific data on an end-point system using a server.

For example, an agent operating on an end-point system may receive a command from a broker or server. Based on this command, the agent may conduct an application-specific user data search on the end-point system on which the agent is operating. The particular attributes for the application-specific user data search may be specified in the command.

The agent may conduct the search, and then process the search results on the end-point system. Once search results are available, the agent may verify that a communications connection with the broker is currently available. If the communications connection is available, then the agent may send the search results from the end-point system to the broker. If the communications connection is not currently available, then the agent may store the search results on a data storage device located on the end-point system. In some examples, the search results may be stored in an encrypted data store on the computer-readable medium of the end-point system.

When the agent stores search results on the computer-readable medium of the end-point system, the application-specific data search may be suspended when the data store reaches a pre-determined size limit.

If the search results have been stored on the computer-readable medium of the end-point system, in part or in whole, then, the stored search results may be removed from the computer-readable medium of the end-point system after the stored search results have been sent from the agent to the broker.

Once stored search results have been removed from the end-point system, and the data store size has decreased below a pre-determined size limit, then the application-specific data search may be resumed. This second pre-determined size limit may be the same as, or may be different from the first pre-determined size limit (i.e. the size limit that determines when the search should be suspended).

According to some embodiments, there is a system, method, and computer-readable medium for dispatching a message from a broker to locate application-specific data on an end-point system.

The broker may receive a message from a server. The message may be addressed using a unique name for an agent or end-point system, such that the meaning of the unique name cannot be easily determined by a third party.

The broker may store the message in a buffer that corresponds to the unique name, so that the message can be retrieved by the intended recipient agent. When the broker receives a request from the appropriate agent, the broker may send the message to the agent. In some examples, the buffer may be a queue.

The broker may receive a request from the agent to send messages addressed to the unique name of the particular agent, and my subsequently send any or all corresponding messages in the buffer to the addressed agent.

The addressed name of the agent (or end-point system) may be a unique code name that has been derived from information pertaining to the end-point system (or agent).

The server may select a particular output communications port for communicating with the broker, such that any corresponding inbound port is inactive, disabled, or inaccessible.

The message may contain a command that defines a search for application-specific user data to be performed by the agent on the end-point system.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
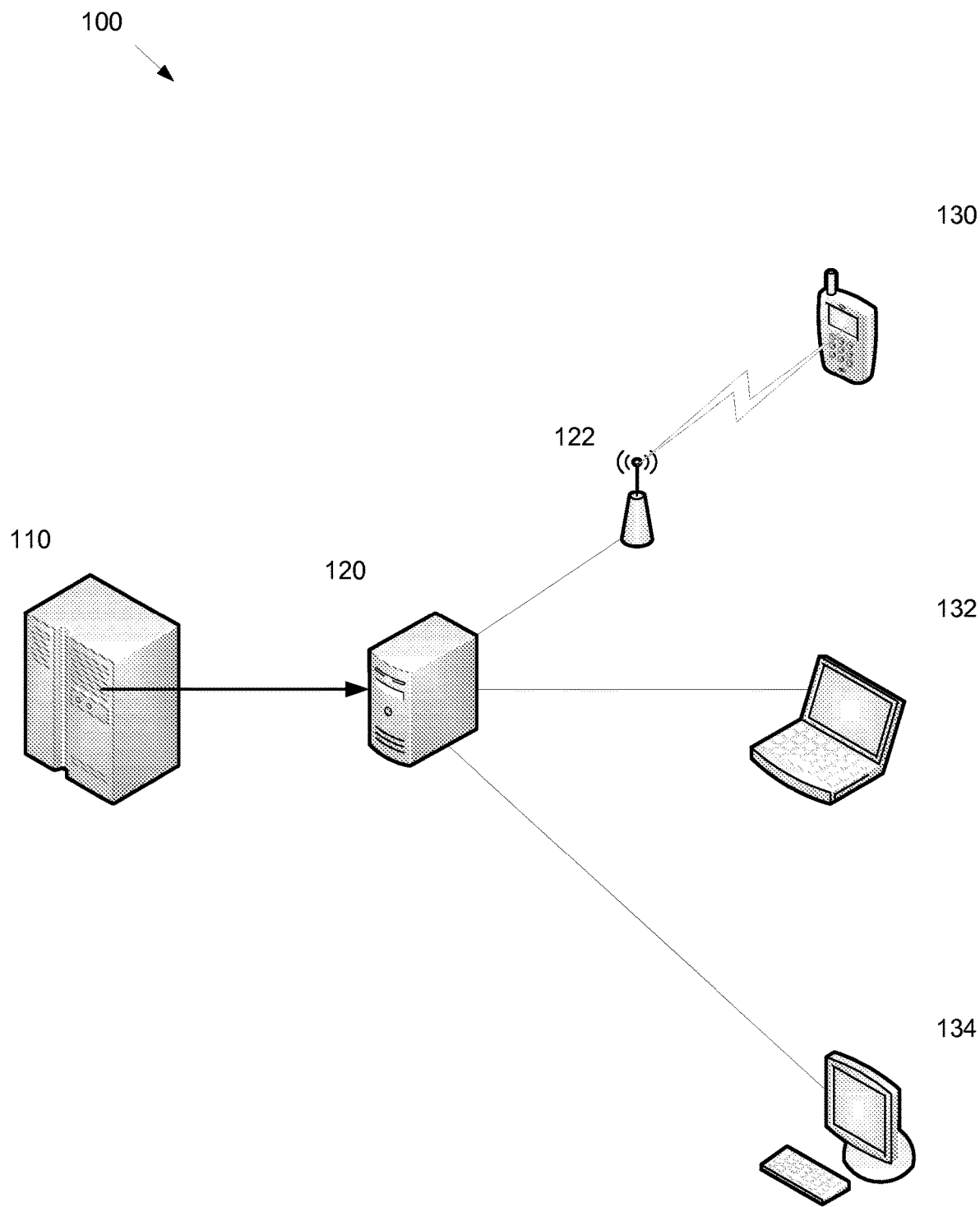
FIG. 1 is a network schematic including a server, broker, and multiple end-point systems according to one embodiment.

For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. In some cases, embodiments may be implemented in one or more computer programs executing on one or more programmable computing devices comprising at least one processor, a data storage component (including volatile memory or non-volatile memory or other data storage elements or a combination thereof) and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

In some embodiments, each program may be implemented in a high level procedural or object-oriented programming and/or scripting language to communicate with a computer system. However, the programs can be implemented in assembly or machine language, if desired. In any case, the language may be a compiled or interpreted language.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various apparatuses or processes will be described below to provide an example of one or more embodiments. No embodiment described below limits any specific claimed embodiment and any claimed embodiment may cover processes or systems that differ from those described below. The claimed embodiments are not limited to systems or processes having all of the features of any one system or process described below or to features common to multiple or all of the systems described below. It is possible that a system or process described below is not an embodiment of any claimed embodiment. Any embodiment disclosed below that is not claimed in this document may be the subject matter of another protective instrument, for example, a continuing patent application or divisional application, and the applicants, inventors or owners do not intend to abandon, disclaim or dedicate to the public any such claimed embodiment by its disclosure in this document.

Referring now to FIG. 1, illustrated therein is an example of a simplified network 100 comprising a server 110, a broker 120, and multiple end-point systems 130, 132, and 134. The network may also include other known networking equipment, as necessary, such as wireless transmitter 122. Generally speaking, network 100 may be implemented over the Internet, an intranet, LAN, WAN, etc.

According to some embodiments, the server 110 may direct communications to an end-point system, such as end-point systems 130, 132, and 134 via the broker system 120. Generally, the broker may be seen as a go-between or communications dispatch buffer, the purpose of which will be explained in further detail below.

For the purposes of this document, the term "operator" will generally be used to refer to the user of the server 110. For example, an operator may be a computer system administrator, network system administrator, investigator, or law enforcement officer, as well as others.

Various embodiments of end-point systems are contemplated. For example, end-point system 130 is a mobile device, such as a cellular phone, tablet, or other mobile communications device. End-point system 132 is a laptop computer or personal computer. End-point system 134 is a desktop computer, such as may be connected to a corporate or public network.

The term "end-point system user" will generally be used to refer to the a person who uses an end-point system, such as by accessing communications applications on the end-point system. The end-point system user may be an individual that the operator identifies as the subject of a search for application-specific user data. For example, an end-point system user may be an employee, a person using a public or corporate computer network, or any other individual. The end-point system user may own and operate the end-point system, or the end-point system user may be a periodic or one-time user of an end-point system that is owned and by someone else.

There may be a system administrator for the end-point system. In some cases, such as when the end-point system user owns or is responsible for the end-point system, the end-point system user may also serve the role of system administrator. In other cases, such as on a corporate or public network, a system administrator may be a distinct individual from the end-point system user.

The communications from the server 110 to an end-point system may involve the remote installation of an agent on the end-point system. Subsequent to an agent being installed on an end-point system, the communications from the server 110 may include commands issued to the agent for locating application-specific user data on the end-point system.

For cases in which the system administrator is not the same person as the end-point system user, the operator may collaborate with the system administrator in order to deploy the agent over the network 100. In other cases, the operator may collaborate with the system administrator in order to install the agent directly on an end-point system. The operator may also be the same person as the system administrator, in some situations.

Once the agent is installed on the end-point system, the operator is able to send commands from the server to the agent, in order to perform specific application-specific user data location operations on the end-point system. The issuance of commands by the operator from the server to the agent will be described in further detail below. The commands may be delivered to the agent via the broker 120.

According to some embodiments, the broker 120 may receive communications from the server 110. These communications are generally intended to be delivered to the end-point system, and may include the installation of an agent on the end-point system, or commands to be received by an agent that is running on the end-point system, or other communications messages.

In one aspect, the broker 120 allows the server 110 to send communications using an outbound port only. These communications are received by the broker 120, and held for delivery to the appropriate end-point system. In this case, the use of the broker 120 means that there is no requirement for two-way communications directly between the server 110 and an end-point system. The broker 120 may store a message from the server, so that the message can be retrieved by the appropriate end-point system.

Once a message from the server 110 has been stored on the broker 120, the message may be retrieved by the intended end-point system for further processing. For example, the message may contain a command for the agent running on the end-point system. In this case, the agent would subsequently conduct the application-specific user data search as specified in the command.

After an agent conducts an application-specific user data search on an end-point system, search results will be collected by the agent. These search results may be stored by the agent on the end-point system; or these search results may be sent from the end-point system to the broker 120. The broker 120, upon receiving search results from an agent on an end-point system, may proceed to relay the search results to the server. In this way, the use of the broker 120 means that there is no requirement for two-way communications directly between the server 110 and an end-point system.

According to other embodiments, it may be possible to implement a network that does not include a broker 120. For example, the server 110 may communicate directly with any or all of the endpoints 130, 132, and 134. In this case, certain functionality that would otherwise be provided by the broker 120 may not be available.

Figure 2:
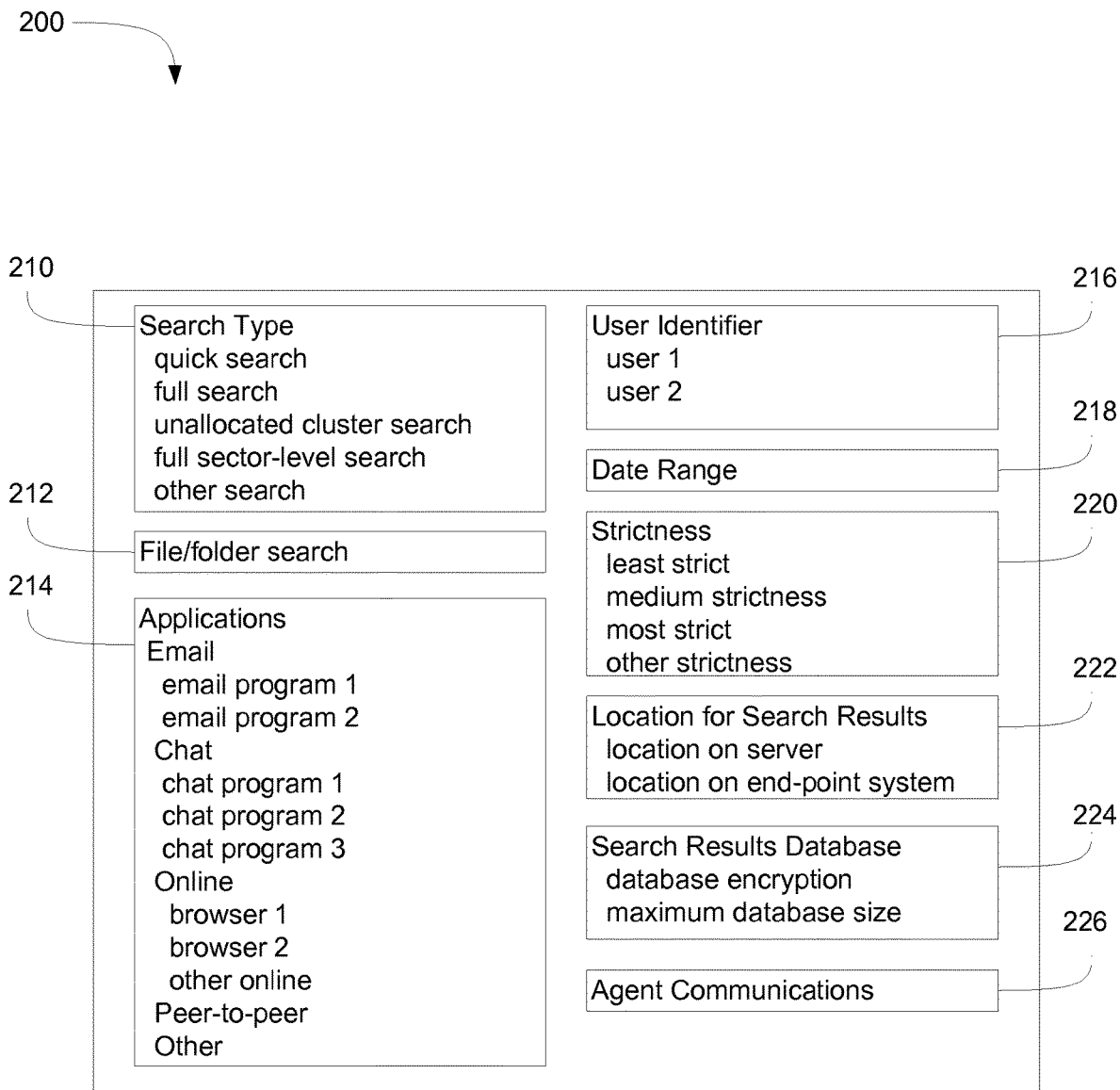
FIG. 2 is an information map that provides a command that can be transmitted over the network of FIG. 1.

An example of some command parameters 200 is provided in FIG. 2. The command parameters may be selected by the operator, for example, on a server. The command parameters may define a command that can be sent to an agent. Once a command is received by an agent, the agent may process the command in order to conduct an application-specific user data location operation on an end-point system, as specified by the operator.

For example, an operator may select one of a variety of search types 210. Search types may include a quick search, a full search, an unallocated cluster search, a full sector-level search. Other search types are also possible. An operator may also choose to select a particular file/folder to search 212.

According to some embodiments, the operator may select to search data pertaining to all or some of various applications types 214. For example, application types might include email, chat, online, peer-to-peer, or other application types. For each application type 214, there may be one or more instances on a particular end-point system. For example, an operator may select to search data pertaining to one or more particular chat programs.

Additionally, the operator may choose to direct the search towards data pertaining to a particular end-point system user or users 216. In some cases, for example, for an end-point system that is part of a public or corporate network, multiple users may use one end-point system, and the operator may only be interested in the user data pertaining to one particular user. In other cases, a particular user identifier of interest may not be known at the time of the operator defines the command parameters.

According to some embodiments, the operator may be able to specify a particular date range 218 for which the agent should conduct a search on the end-point system. In some cases, the operator may also be able to set a strictness level 220 for the search. The date range 218 and strictness level 220 are further described below.

Other parameters that define a command may be set by the operator. These include the location for search results 222 (both on the server and on the end-point system, as necessary), parameters 224 related to a search-results database on the end-point system, and agent communications parameters 226 that define, for example, how and when the agent may communicate with the broker (or server, as the case may be).

Figure 3A:
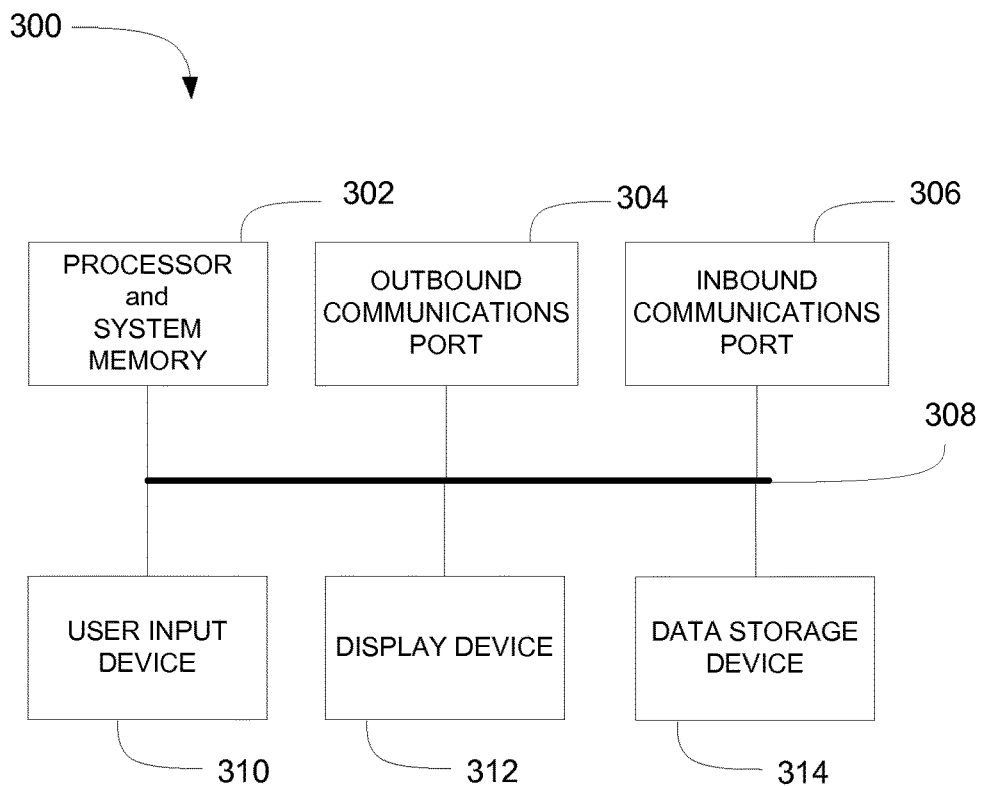
FIG. 3A is a schematic of a server system, such as a part of the server shown in FIG. 1.

Referring to FIG. 3A, illustrated therein is an example of a server system 300. According to some embodiments, the server system 300 may comprise a processor and system memory 302, an outbound communications port 304, an inbound communications port 306, a user input device 310, a display device 312, and a data storage device 314. The various components may be interconnected using a system bus 308.

The user input device 310 and display device 312 enable the operator to interact with the server system 300. For example, the operator may use the input device 310 to specify the attributes of a command that the operator intends to send to an agent. The operator may also use the display device 312 to review the results of particular search that have been sent to the server from an agent, as a result of a command.

The server system 300 may comprise an outbound communications port 304 and an inbound communications port 306. The instructions executed by the processor 302 may specify that the outbound communications port 304 or inbound communications port 306 be open or closed (accessible or inaccessible) at certain times. For example, the inbound communications port 306 used by the server system 300 for receiving communications from an agent or a broker may be closed (inaccessible) during specific times. For example, blocking the inbound communications port 306 during specific times may reduce the risk that a third party will identify that a server is operating covertly to perform application-specific user data location operations on a remote end-point system, and may also improve security of the server in some situations.

Figure 3B:
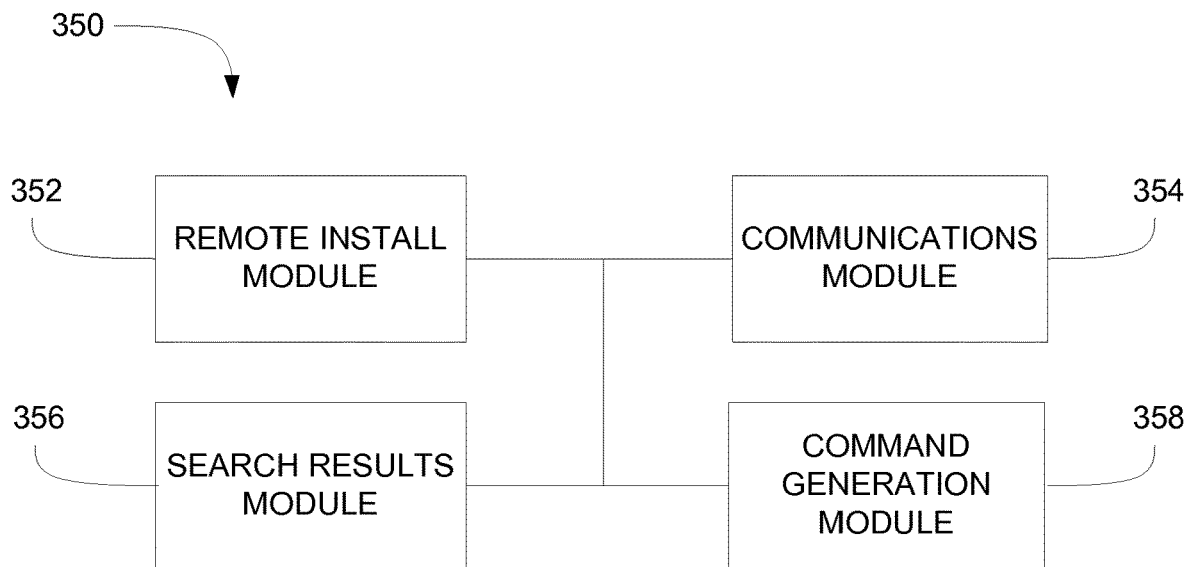
FIG. 3B is a schematic of a server module, which may operate with the server system of FIG. 3A.

An example server module 350 is shown in FIG. 3B. The server module 350 may operate with the server system 300. The server module is composed of sub-systems, sub-modules, or components, including a remote install module 352, a communications module 354, a search results module 356, and a command generation module 358.

In some situations, an operator work flow may begin with the remote installation of an agent on a remote end-point system. In such a case, the remote install module 352 may be used to perform a remote installation of an agent. This remote installation may be accomplished by transmitting messages to an end-point system via a broker. In other some cases, the remote installation may be accomplished by transmitting messages directly to an end-point system from the server. The messages may include instructions that comprise the installation and operation of an agent.

Once an agent has been installed on an end-point system, commands can be sent to the agent in order to specify an application-specific user data search on the end-point system. An operator may use the command generation module 358, along with the processor and system memory 302, user input device 310, and display device 312, to generate a command.

For example, using the command generation module, an operator may select particular attributes such as any or all of a search type 210, file/folder search 212, applications 214, user identifier 216, date range 218, strictness setting 220, locations for search results 222, search results database settings 224, and agent communications options 226.

The selected command attributes may be used by the command generation module 358 in order to generate a command to be sent to an agent. The agent may subsequently conduct a search on the end-point system, as specified by the command, resulting in search results. The agent may then transmit the search results.

Search results may be sent from a broker or agent, received by the communications module 354, and subsequently processed by the search results module 356. The search results module may process the search results, so that the search results can be provided to the operator in a meaningful form. For example, the search results may be processed by the processor 302 and displayed on the display device 312.

The search results may also store the search results in a search results location. For example, a search results location on the data storage device 314 may be specified, which may be referred to as "The Case Folder". The results located by the search could then be flagged by the agent with this location identifier, so that the search results could later be saved in the case folder on the server. Generally, the case folder should be a location on the server that has sufficient free space (e.g. a few gigabytes, or terabytes, or more, as the case may be).

Figure 4A:
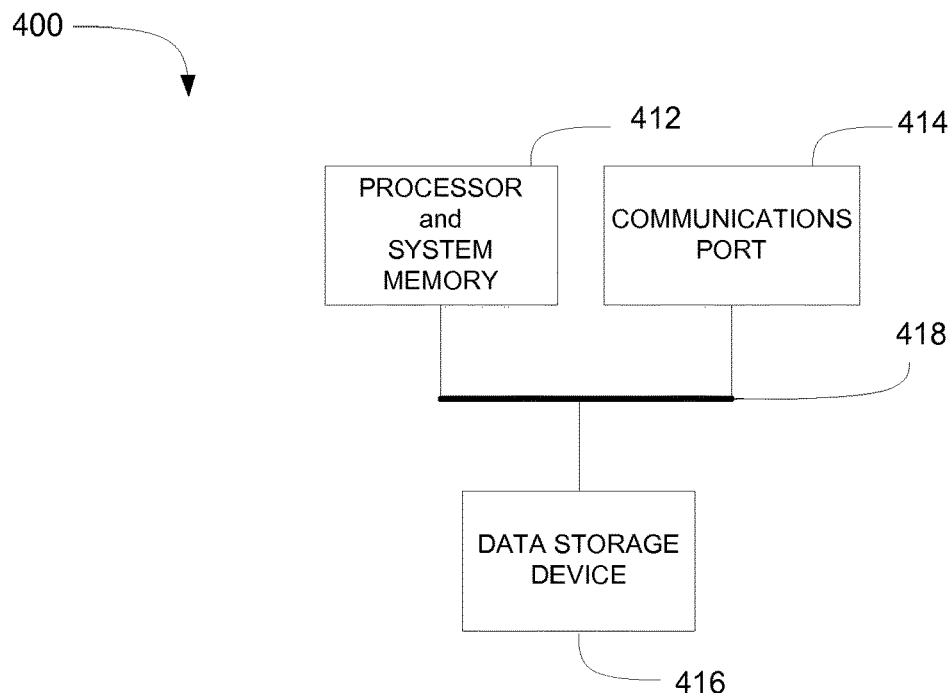
FIG. 4A is a schematic of a broker system, such as a part of the broker shown in FIG. 1.

An example of a broker system 400 is shown in FIG. 4A. In practice, the broker system 400 may comprise any of a variety of computer systems. In the example of FIG. 4A, the broker system 400 comprises at least a processor and system memory 412, a communications port 414, and a data storage device 416, which are all interconnected using a system bus 418.

Figure 4B:
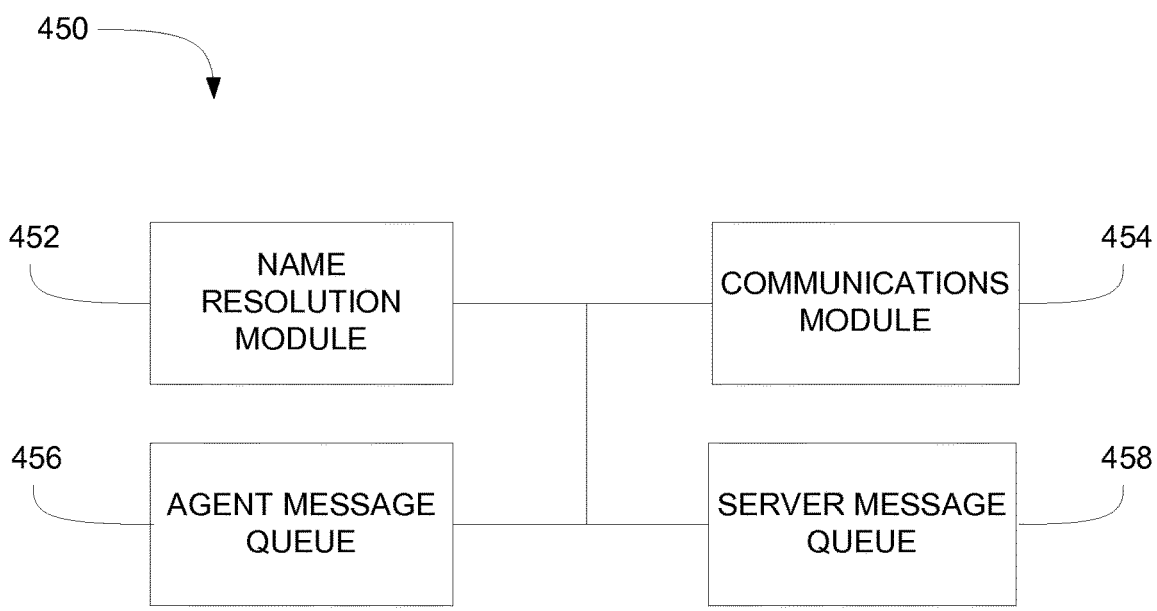
FIG. 4B is a schematic of a broker module, which may operate with the broker system of FIG. 4A.

Referring now to FIG. 4B, illustrated therein is a broker module 450, which may operate with the broker system 400.

The broker module 450 is composed of sub-systems, sub-modules, or components, including a name resolution module 452, a communications module 454, an agent message queue 456, and a server message queue 458.

The name resolution module 452 may allow the broker module 450 to resolve inbound messages with a particular server or agent that is the intended recipient for the message, based on a unique name for the recipient. In some cases, in order to maintain covert operations, or to conceal the identity or location of a particular server or agent (or end-point system that is running the agent), messages may not be addressed using an address that could be easily resolved by a third party.

For example, it may be possible to identify a particular server or end-point system by resolving a unique network address or device address using known standards. Each server system and end-point system may have a unique IP address, or MAC address, etc.

The name resolution module 452 may uniquely and/or privately correlate a known or public address, such as an IP address or MAC address with a new name. For example, a server with an IP address of 255.255.100.100 may be given the name "Server X". Similarly, an end-point system (or agent running on the end-point system) may be given the name "Agent Y". In this case, messages sent to and from the broker could be addressed to "Server X" or "Agent Y", as the case may be, without the need to include an IP address. In such a case, if a message to or from the broker was intercepted by a third party, the name "Server X" or "Agent Y" would be meaningless to the third party.

In the above example, the name resolution module 452 would allow the broker to resolve the name "Server X" with the IP address 255.255.100.100 (or other network or device address, as the case may be) so that the broker could properly relay messages from an agent to the server associated with the name "Server X".

The communications module 454 may be implemented in association with the communications port 414. The communications module 454 may be operable to send and receive messages to and from the broker. In some cases, communications module may be operable to use a resolved address from the name resolution module 452 in order to address outbound communications.

According to some embodiments, broker module 450 may receive instructions from a server or agent in order to define the timing of communications sent by communications module 454, or other attributes of the communications sent by communications module 454.

The agent messaging queue 456, which may be implemented with the data storage device 416 and operable with the processor and system memory 412, can server as a message storage and retrieval module, or mailbox. For example, the broker module 450 may create a unique instance of an agent message queue 456 for each agent with which the broker module 450 communicates.

In some embodiments, when a message is received by the broker module 450 from a server, and the message is intended for a particular agent or end-point system, the broker module 450 will place the message in the appropriate agent message queue 456.

Subsequently, a particular agent may send an enquiry to the broker module 450, which may be received by communications module 454, and which might enquire as to whether there are any pending messages for the agent. In this case, the broker module 450 may deliver the message from the agent message queue 456 to the enquiring agent, using the communications module 454.

Similarly, the broker module 450 may create a unique instance of a server messaging queue 458 for each agent with which the broker module 450 communicates. Messages intended for a particular server may be placed in the appropriate server message queue 458 for future retrieval.

Other embodiments of the agent message queue 456 and server message queue 458 do not necessarily require that messages be arranged in a queue. Other embodiments for a message storage and retrieval, or mailbox structure may be used as well.

Figure 5A:
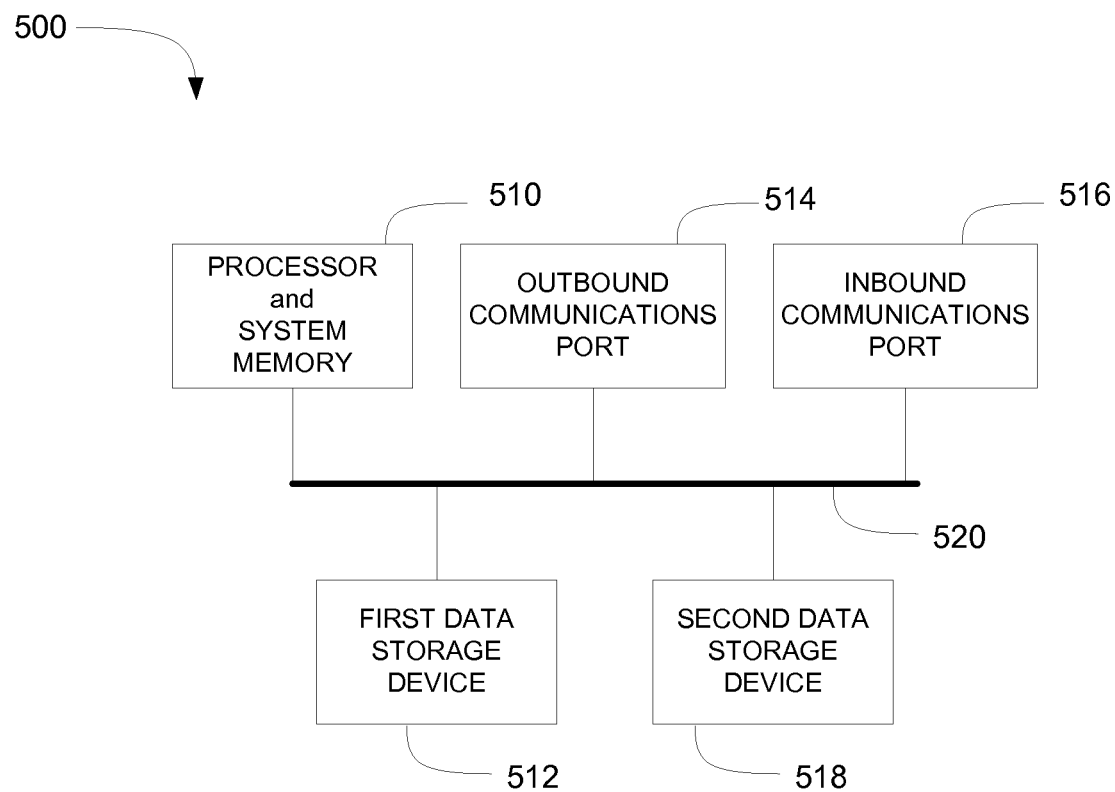
FIG. 5A is an end-point system, such as one shown in FIG. 1.

Referring now to FIG. 5A, illustrated therein is an end-point system 500 on which application-specific data may be located, according to some embodiments. The end-point system 500 includes a processor and system memory 510, a first data storage device 512, an outbound communications port 514, and inbound communications port 516, and a second data storage device 518. In this embodiment, the various components 510, 512, 514, 516 of the system 500 are operatively coupled using a system bus 520.

The end-point system 500 may be various electronic devices such as personal computers, networked computers, portable computers, portable electronic devices, personal digital assistants, laptops, desktops, mobile phones, smart phones, tablets, digital televisions, digital video recorders, onboard vehicle computer or communications systems, etc.

In some examples, the first data storage device 512 may be a hard disk drive, a solid-state drive or any other form of suitable data storage device and/or memory that may be used in various electronic devices. The data storage device 512 may have various application-specific user data associated with various applications stored thereon. The application-specific data may be generated when the user is interacting with one or more applications.

The applications that may have application-specific data associated therewith, for example, may include various instant chat messaging applications provided by various online social networks, email clients which may be located locally or accessed using an online interface, peer-to-peer file sharing applications, various web based applications such as social networks, websites, etc.

In many cases, some of the data associated with these applications may be deleted automatically. In some cases the data may be deleted upon command from the user using the application. For example, many Internet browser applications may delete browsing history automatically after a certain period of time (e.g. 1 hr, 24 hr, 1 week, 1 month). Similarly, in some cases cached data may be deleted for various websites automatically. The browser applications may also provide the user with an option to delete cache data or browsing history. However, when such data are deleted, the deleted data may not in fact be physically deleted from the data storage device 14 as explained below.

In particular, many operating systems and/or device driver software may not physically delete the data from the data storage device 512 immediately when a command to delete such data is received. Instead, the addresses on the data storage device 512 that stores such data may simply be marked as "unallocated" or "available". Such indications inform the operating system or other applications that these addresses are now available to store other data. The old data may subsequently be overwritten and thereby deleted when there are new data stored in such addresses.

Accordingly, it is possible that the data flagged to be deleted may remain physically undeleted from the data storage device 512 for an extended period of time even though a request had been made to delete these data by the application or the user (or both).

It may be desirable to locate application-specific user data in the data storage device 512 even after such data have been "deleted" (but not physically deleted from the data storage device 512).

In the embodiment as shown, another data storage device is provided, in addition to the first data storage device 512, namely the second data storage device 518. The first data storage device 512 and the second data storage device 518 may be physically-separate data storage device, or may be different parts of the same physically data storage device. The distinction between first data storage device 512 and second data storage device 518 is made, in part, to assist in the description of the end-point system 500.

The second data storage device 518 may be used to store computer-executable instructions that can be executed by the processor 510 to configure the processor 510 to locate application-specific user data in the data storage device 512. The computer-executable instructions may be derived from the commands sent to the agent.

Additionally, the second data storage device 518 may be used to store the application-specific user data that has been located on the first storage device 512. For example, once application-specific user data have been located on the first data storage device 512 by the processor 510, the processor 510 may compile the located application-specific user data into a database on the second data storage device 518. A database on the second data storage device 518 may be encrypted, for example, so that if a user of the end-point system identifies that the database has been stored on the second data storage device 518, the second user will not be able to compromise the integrity of the located application-specific user data.

It should be noted that it is not necessary to provide a second data storage device, and in other embodiments, the instructions may be stored in the first data storage device 512 or any other data storage device. However, it may be desirable for the instructions to be stored in a data storage device other than the data storage device 512 such that any "deleted" data stored thereon will not be unintentionally overwritten by the computer-executable instructions to configure the processor 512. Since the operator may not be able to determine the structure of the end-point system, a second data storage device might not be available.

The end-point system 500 may comprise an outbound communications port 514 and an inbound communications port 516. In some embodiments, the instructions executed by the processor 510 may specify that the outbound communications port 514 or inbound communications port 516 be open or closed (accessible or inaccessible) at certain times. For example, the outbound communications port 514 used by the end-point system 500 for transmitting located application-specific user data may be closed (inaccessible) during specific times. For example, blocking the outbound communications port 514 during specific times may reduce the risk that a user of the end-point system 514 will identify that a covert application-specific user data location operation has occurred.

Figure 5B:
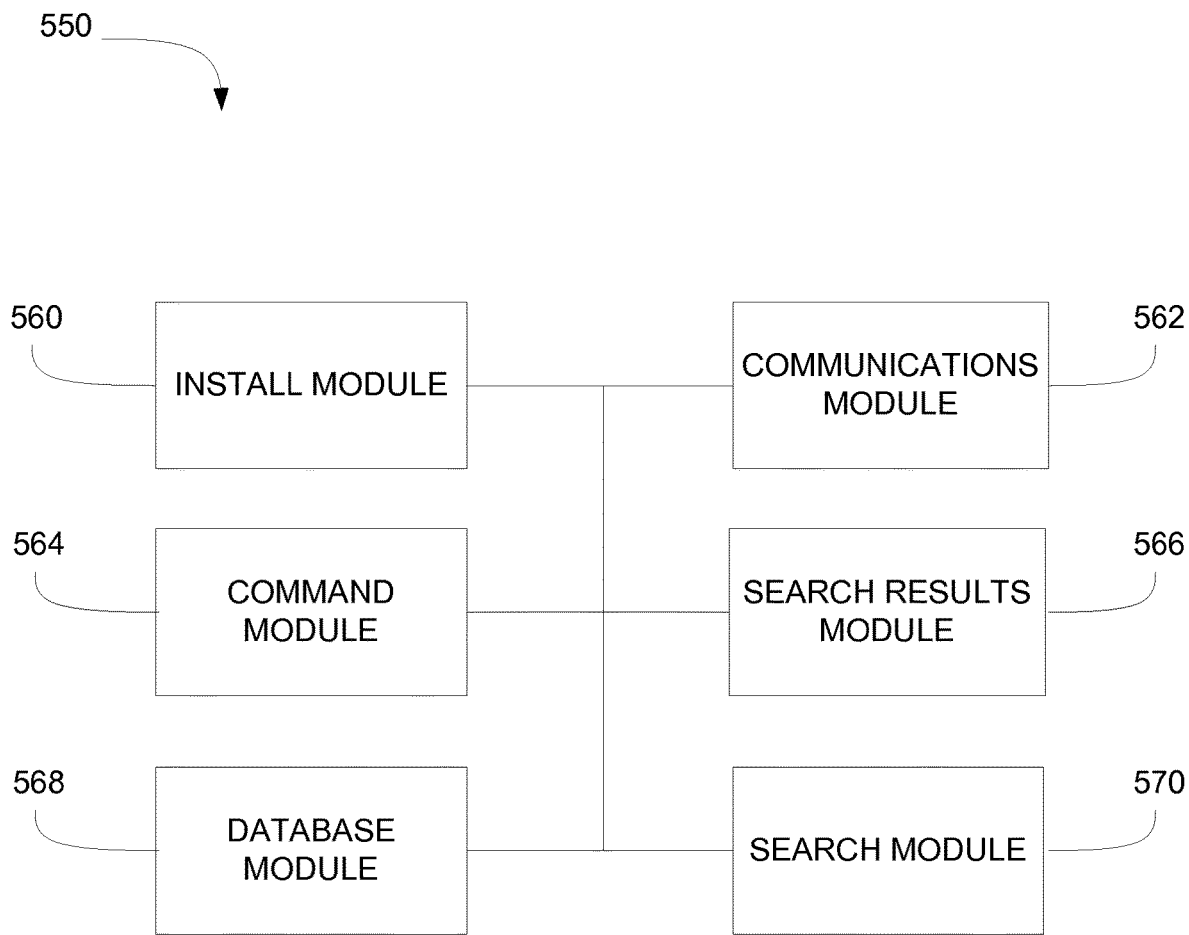
FIG. 5B is a schematic of an agent, which may operate with the end-point system of FIG. 5A; and, FIG. 6. is a flow diagram, depicting a method for sending a message from a server to broker, relaying the message from the broker to an agent, executing an application-specific user data search on the agent, and returning the search results from the agent to the broker.

Referring to FIG. 5B, illustrated therein is an example embodiment of an agent 550 that may be operable, for example, on end-point system 500. In some cases the "agent" may be embodied by a set of computer-executable instructions, such as may be stored on a non-transitory computer-readable medium. The agent 550 may also be embodied in other forms, and may be a component of, subsystem of, or run on the end-point system 500.

The agent may include an install module 560. Prior to operation of the agent 550, the agent 550 should be installed on an end-point system. The installation may occur in various ways. For example, the agent 550 may be installed by a local end-point system administrator, or the agent may be installed by an operator, using a remotely-located computer system, such as a server 510 or a broker system 520 acting between a server and an end-point system.

For example, a local installation may be conducted by a system administrator in a corporate or public network environment, so that the operator is able to operate the agent 550 with respect to application-specific user data pertaining to employees, public, or anonymous users.

In cases when the agent 550 has been installed with the knowledge of the end-point system administrator, the operation of the agent 550 on the end-point system may nonetheless be concealed from users of the end-point system, and the agent 550 may operate in a covert manner.

In some situations, a local installation of the agent 550 may be preferred due to the nature of the end-point system, even though the searching of the end-point system for application-specific user data without the agent 550 would not be precluded due to remote location or the need for covert operation. For example, certain hardware devices may be constructed in such a way as to make their hard drives or other data storage devices difficult to physically access, even when the device itself, is in the physical possession of an operator. In such a case, the installation of the agent 550 may preclude the need to physically access the hard drive of the device.

The agent 550 may also be installed using a remotely-located server. For example, it may be desirable to install an agent 550 on an end-point system that is locally inaccessible (e.g. due to geographical remoteness). It may also be desirable to install an agent 550 on an end-point system that is not in the possession of the operator who desire to install the agent. In some cases, the covert installation of the agent 550, achieved through an installation that is transparent to the end-point system user, may be necessary in order to maintain the integrity of the application-specific user data that are to be located. If end-point system users know or are suspicious that their application-specific user data are going to be search, the users may take further measures to destroy the data before they can be searched.

According to some embodiments, the agent 550 may be installed on an end-point system from a remote server. According to other embodiments, the agent 550 may be installed using a broker system between a server and the end-point system.

Once the agent 550 has been installed on the end-point system, then the agent 550 is able to receive commands in order to conduct specific operations related to the location of application-specific user data.

The communications module 562 may operate to enquire whether any new commands have been issued for the agent 550. The communications module 562 may make periodic, scheduled or random enquiries to a server or broker system.

For example, the communications module 562 may be configured to enquire on a daily, hourly, weekly, or other periodic basis to determine if commands have been issued for a new search. According to some embodiments, it is possible for the communications module 562 to determine when the end-point system has been idle (e.g. free from other user activity) for a certain period of time, and to enquire for new commands only during such idle periods. It may also be possible to configure the communications module 562 to be operable only during certain hours of the day, week, or month.

The communications module 562 may be configured so that communications between the agent 550 and server, or agent 550 and broker, as the case may be, are conducted in a way that is not readily apparent to a user of the end-point system. The prudent timing of communications may assist in making the communications less apparent to a user.

The communications module 562 may also be operable to independently control inbound communications ports and outbound communications ports. For example, the communications module 562 may receive communications from a server or broker on an inbound communications port during a specific time interval, but may prevent communications from the agent to the server or broker during the same specific time interval, and vice-versa.

The communications received by the communications module 562 may include commands that specify an operation of locating application-specific user data on the end-point system. Commands may specify the parameters for the agent 550 to conduct a search on the end-point system, such as parameters relating to timing of the search, type of search, applications to search, users to search, the size of the stored search results database, etc.

Various types of searches that can be specified in the command, and performed by the agent may include a quick search. The quick search is generally configured so that it can be executed quickly but not all relevant data stored in the first data storage device 512 may be located by the search. The quick search, in some examples, will perform the search for application-specific data at common folder and/or file locations on the end-point system, the pagefile.sys file, a filesystem file called $Logfile, and files that are stored in the Master File Table (MFT). This allows the quick search to focus on locations where relevant data may be usually found. However, any application-specific data stored in other locations on the end-point system that are not searched will not be located by the quick search.

In other cases, a full search may be performed. The full search may be more comprehensive than the quick search and, for example, may search all areas of a hard drive on the end-point system that may contain application-specific user data. The full search, in some examples, searches all the areas the quick search searches, and in addition searches Volume Shadow Copy files, the hiberfil.sys file, unallocated/free space, and/or file "slack" space.

In some cases, another type of search limited to unallocated clusters may be performed. This search may only search those locations in the data storage device 512 that are identified as unallocated or free. This may recover data that had been marked as "deleted" but has not yet been physically deleted from the data storage device 512. This search also searches file "slack" space, which essentially is unused, unallocated space at the end of a file.

In some other cases, a full sector-level search at the sector level may be specified in the command sent to the command module 562. When conducting the full sector-level search, the processor 510 may be configured to conduct a search at the sector level without any reference to the file system. In some cases, the data storage device 512 stores data in blocks of predetermined size called "sectors". The full sector-level search searches the data stored in the data storage device on a sector-by-sector basis without regards to how the data may be logically connected at higher levels. For example, the search may read the raw data from every sector on the device, starting at the first sector, and ending at the last sector. The entire storage device is read by reading the raw data at the sector level, instead of reading individual files.

In some cases, a file/folder search that is limited to specified locations may be performed. In such cases, only the files and/or folders specified by the operator will be searched on the end-point system.

In some embodiments, the operator may specify one of the search options in the command, in order to proceed with a particular search on the end-point system. In other embodiments, more than one of the options or other search options may be specified, such as to perform multiple searches on the end-point system.

For example, after specifying the desired search option in the command, the operator may be presented with specific applications (e.g. email, chat, online, peer-to-peer, etc.) for which the operator wishes to search for associated application-specific data on the end-point system.

The operator may be presented with options to select various functions and options pertaining to the search to be performed on the end-point system. For example, the operator may be allowed to select specific applications to search for application user data. In some cases, the operator may select one or more of chat applications, one or more of email applications, one or more of web-related applications and/or one or more of peer-to-peer file sharing applications.

In some embodiments, a user identifier associated with a particular application on the end-point system may be specified in the command, in order to search for application-specific data.

A user identifier pertaining to a user of the end-point system may be specified in the command sent to the command module 564. The user identifier may be used to decrypt data logs associated with one or more applications. In some embodiments, the processor 510 may automatically generate one or more user identifiers without a user identifier being included in the command sent to the command module 564. For example, the processor may look for and use one or more user identifiers associated with one or more applications that are stored in the data storage device 512, such as user identifiers for the operating system, other chat applications, and so on.

The operator is also able to select a date range within the command that is sent to the command module 564. The date range allows the operator to modify the search on the end-point system so as to focus the search to a desired range. Specifying a date range may reduce false positives results located by the search. For example, if the computer was first used by the user on Jan. 1, 2011, any results that seem to have a date before Jan. 1, 2011 may be disregarded as being false positives. The command sent to the command module 564 may also be configured to provide a default date, for example, the date that the associated application was first used.

The command sent to the command module 564 may also include a "strictness" setting that may help reduce false positives. The possible settings may include, for example, "Least Strict", "Medium Strictness", and "Most Strict". Generally the higher the strictness setting, the more aggressive the agent's search results module 566 will be in filtering out hits that do not appear to be valid. This could be done, for example, by taking the size of the recovered message text and comparing the percentage of that text that is null characters (e.g. hex 0x00)

In some cases, the strictness setting may determine the percentage of null characters of a result that should be accepted as valid.

Generally, the strictness setting allows the operator to indicate how much error he or she is willing to tolerate. For example, a high strictness setting may reduce the number of false-positive results (i.e. the results located by the search module 566 that do not contain application-specific data), but it also increases the chance of erroneously discarding actual application-specific data. In contrast, a low strictness setting will generally provide more results and reduce the chance of erroneously discarding valid results; though there may be a chance that more of the results are false-positive results.

According to some embodiments, the operator may also be able to select a location on the end-point system where the search is to be conducted, by specifying this location in the command to be sent to the command module 564. Various locations for the search may be available on the end-point system. An attached data storage device, for example, the data storage device 512 or 518, or a virtual drive mounted from forensic image files on the end-point system may be available as search locations.

According to some embodiments, the operator may also be able to indicate search result output options for the results of the search, and specify these output options in the command to be sent to the command module 564. These output options may affect how the search results module 566 returns search results, via the communications module 562, to the server or broker system. The output options may also affect how the search results module 566 provides search results to the database module 568.

A search results location on the end-point system may be specified, which may be referred to as "The Agent Folder". In some cases, the operator may determine that the particular location of the agent folder, for example, on data storage device 518 of the end-point system, should be transparent to a user of the end-point system. For example, the operator may choose to specify a hidden folder as the agent folder so that the agent folder is not easily apparent to a user of the end-point system. Generally, the agent folder should be a location on the end-point system that has sufficient free space (e.g. a few gigabytes, or more) and is accessible while the search is being conducted.

According to some embodiments, the database module 568 may receive the search results from the search results module 566 prior to the search results being stored in the agent folder. For example, in certain situations, the search results module 566 may provide search results in real time, or periodically, or in increments, to the communications module 562 so that the search results can be delivered to the server or broker system in real time, or periodically, or in increments.

In other situations, such as when the communications module 562 determines that communications with the server or broker are unavailable, the search results module 566 may provide search results to the database module 568.

Various search results database criteria may have been specified in the command sent from the server to the agent. For example, database encryption parameters, and maximum database size may be included in the command. In some cases, the operator may choose a maximum database size so that the database is not easily apparent to a user of the end-point system.

According to some embodiments, when the database module 568 determines that the database has reached the maximum size, such as may have been specified in the command, the database module 568 may report to the search module 570 that the search operation should be temporarily suspended. For example, the search module 570 may temporarily suspend the search operation until such time as the communications module 562 has established communications with the server or broker system, and some of the search results stored in the database have been sent to the server or broker system. Once search results have been sent to the server or broker system via the communications module 562, and more space has therefore been made available to store the database, the database module 568 may report to the search module 570 that the temporarily-suspended search operation should resume.

Figure 6:
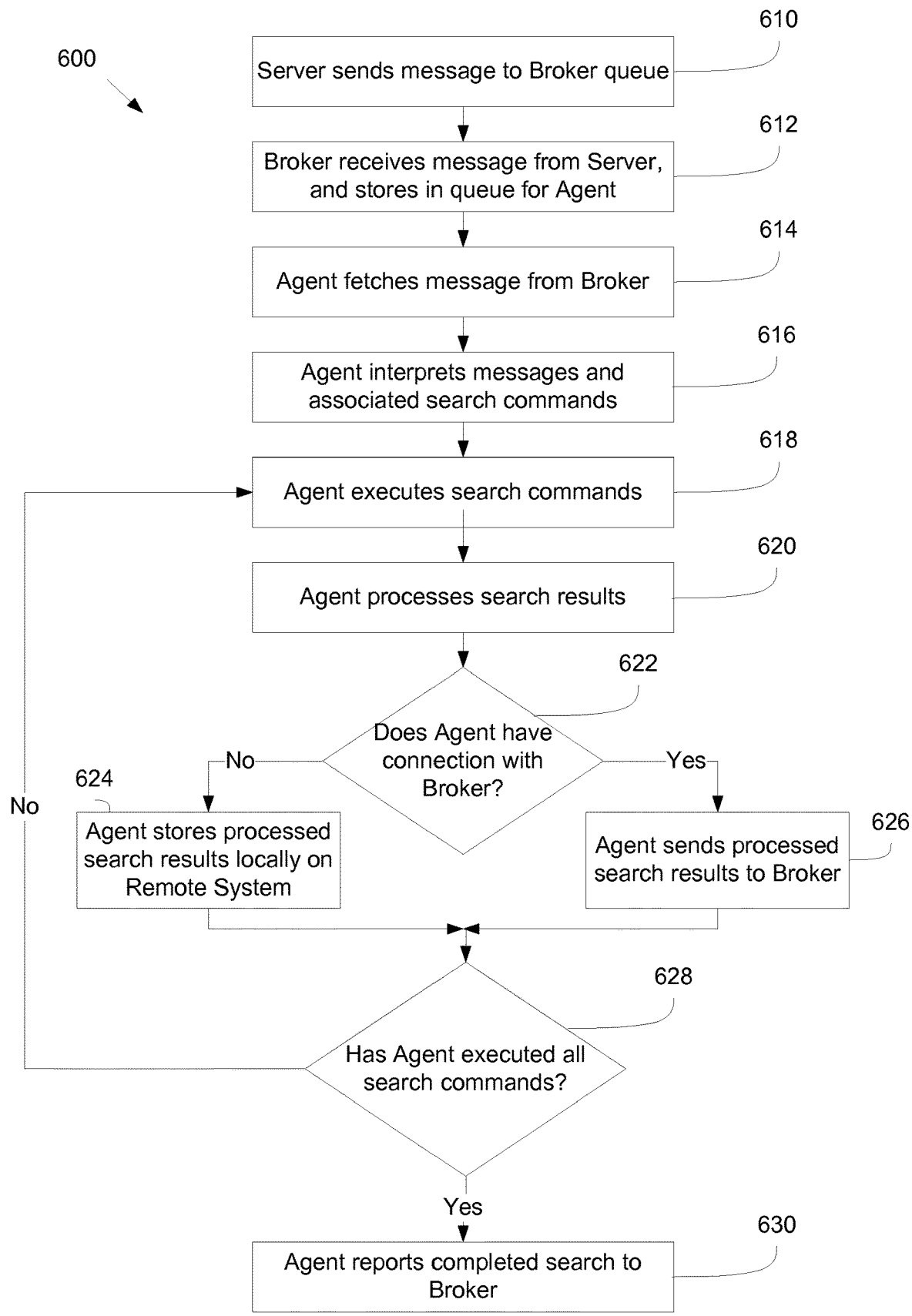

Referring to FIG. 6, there is provided an example of a method for sending a message from a server to broker, relaying the message from the broker to an agent, executing an application—specific user data search on the agent, and returning the search results from the agent to the broker.

In this particular example, it is assumed that an operator has generated a command that specifies an application-specific user data search that the operator intends to conduct with an agent on an end-point system.

At step 610, the operator sends a message from the server to a broker. For example, the message may contain the command as well as the name of the agent for which the command is intended. Other information may be present in the message as well.

At step 612, the broker receives the message from the server, and stores the message in an agent message queue, or other message buffer. In some cases, the agent message queue may be unique to the particular agent for which the command is intended. In other cases, there may be one message buffer shared by multiple agents.

If the message includes the name of an agent, then the broker may allocate the message to a message queue assigned to the named agent.

At step 614, an agent may enquire with the broker, to determine if there are any new messages for the agent. For example, the broker may resolve the name of the enquiring agent, and may check the agent messaging queue corresponding to the agent's name for any new messages.

In this example, it is assumed that there is at least one new message on the broker for the enquiring agent. As a result, the broker may send the new message(s) to the agent.

At step 614, the agent receives the message from the broker, and deciphers the message for a command that is included in the message.

At step 618, the agent begins executing a search for application-specific user data on the end-point system, pursuant to the command. According to some embodiments, the agent may produce real-time search results while the search is being conducted. In other embodiments, the search results may become available periodically, in increments, or once the search is completed.

At step 620, the agent processes the search results. This may include filtering, sorting, or otherwise organizing the search results.

At step 622, the agent enquires as to whether it currently has an available communications link with the broker. For example, the agent may not be currently communicating with the broker because the end-point system is not connected to a communications network, or because operator has selected to limit communications from the agent to the broker, or for other reasons.

If, at step 622, the agent determines that it is not currently communicating with the broker, then, at 624, the agent stores the current search results a data storage device of the end-point system.

According to some embodiments, and/or according to the parameters of the command, the agent may create a database on the data storage device of the end-point system, in which to store the search results. The database may be defined according an encryption format, a maximum size, and other parameters. The agent may store the search results in a hidden or otherwise inaccessible portion of the data storage device.

If, at step 622, the agent determines that it is currently communicating with the broker, then, at 626, the agent sends the search results to the broker. In this case, search results may be send from the agent in real time (as soon as they become available, for example, after step 620). Additionally, the search results send may be search results that were previously stored on the data storage device of the end-point system, such as when the agent determined that it was not communicating with the broker.

At step 628, the agent enquires as to whether the search has been completed.

In some embodiments, if a maximum database size has been specified for use in step 624, the agent may temporarily suspend the search operation when the database reaches the specified maximum size. In this case, the agent may continue to suspend the search operation until the agent is able to send the stored search results to broker, such as at step 626.

Once the search has been completed, then the agent may report the completion to the broker at step 630.

While the above description provides examples of one or more apparatus, methods, or systems, it will be appreciated that other apparatus, methods, or systems may be within the scope of the claims as interpreted by one of skill in the art.

The invention claimed is:

1. A method for dispatching a message from a local computer system to locate application-specific data on a remote computer system, comprising:
   (a) receiving a message from a first remote computer system, the message addressed using a name of a second remote computer system;
   (b) storing the message in a buffer on the local computer system for subsequent retrieval by the second remote computer system;
   (c) receiving a request from the second computer to send a message addressed using the name of the second remote computer system;
   (d) sending a corresponding message in the buffer addressed with the name of the second remote computer system to the second remote computer system, the corresponding message corresponding to the request.

2. The method of claim 1, wherein the buffer is a queue.

3. The method of claim 1, wherein the name of the second remote computer is a unique code-name derived from information pertaining to the second remote computer.

4. The method of claim 1, wherein the first remote computer system selects an outbound port to be active, and selects an inbound port corresponding to the outbound port to be inactive.

5. The method of claim 1, wherein the second computer selects an outbound port to be active and selects an inbound port corresponding to the outbound port to be inactive when sending the request to retrieve the message addressed using the name of the second computer.

6. A non-transitory computer-readable medium comprising instructions executable by a computer processor, the instructions when executed for causing the computer processor to carry out a method for dispatching a message from a local computer system to locate application-specific data on a remote computer system, the method comprising:
   (a) receiving a message from a first remote computer system, the message addressed using a name of a second remote computer system;
   (b) storing the message in a buffer on the local computer system for subsequent retrieval by the second remote computer system;
   (c) receiving a request from the second computer to send a message addressed using the name of the second remote computer system;
   (d) sending a corresponding message in the buffer addressed with the name of the second remote computer system to the second remote computer system, the corresponding message corresponding to the request.

7. The non-transitory computer-readable medium of claim 6, wherein the buffer is a queue.

8. The non-transitory computer-readable medium of claim 6, wherein the name of the second remote computer is a unique code-name derived from information pertaining to the second remote computer.

9. The non-transitory computer-readable medium of claim 6, wherein the first remote computer system selects an outbound port to be active, and selects an inbound port corresponding to the outbound port to be inactive.

10. The non-transitory computer-readable medium of claim 6, wherein the second computer selects an outbound port to be active and selects an inbound port corresponding to the outbound port to be inactive when sending the request to retrieve the message addressed using the name of the second computer.

* * * * *